Sept. 19, 1961 R. K. HOSKIN 3,000,583

APPARATUS FOR RECORDING AND FOR PLAYBACK OF SOUND UTILIZING A TAPE

Filed Aug. 12, 1957 5 Sheets-Sheet 1

INVENTOR.
RICHARD K. HOSKIN
BY Flam and Flam
ATTORNEYS.

INVENTOR.
RICHARD K. HOSKIN
BY
Flam and Flam
ATTORNEYS.

Sept. 19, 1961 R. K. HOSKIN 3,000,583

APPARATUS FOR RECORDING AND FOR PLAYBACK OF SOUND UTILIZING A TAPE

Filed Aug. 12, 1957 5 Sheets-Sheet 3

INVENTOR.
RICHARD K. HOSKIN
BY
Flam and Flam
ATTORNEYS.

INVENTOR.
RICHARD K. HOSKIN
BY
Flam and Flam
ATTORNEYS.

Sept. 19, 1961 R. K. HOSKIN 3,000,583

APPARATUS FOR RECORDING AND FOR PLAYBACK OF SOUND UTILIZING A TAPE

Filed Aug. 12, 1957 5 Sheets-Sheet 5

INVENTOR.

RICHARD K. HOSKIN

BY

Flam and Flam

ATTORNEYS.

United States Patent Office 3,000,583

Patented Sept. 19, 1961

3,000,583

APPARATUS FOR RECORDING AND FOR PLAYBACK OF SOUND UTILIZING A TAPE

Richard K. Hoskin, Gardena, Calif., assignor to Newcomb Electronics Corp., Los Angeles, Calif., a corporation of California Filed Aug. 12, 1957, Ser. No. 677,503
11 Claims. (Cl. 242—55.12)

This invention relates to sound recording and reproduction, especially by the aid of a tape.

The tape may be made of thin magnetic material adapted to be rewound from one reel onto another, and to pass in close cooperative contact with a recording head or a playback head. Such tape devices of this general character are now in common use.

It is one of the objects of this invention to improve in general apparatus of this character.

It is another object of this invention to provide a simple control member that can be optionally moved into any of a number of positions to determine the mode of operation of the device. Such positions may correspond to (1) a neutral position in which brakes are applied for stopping the tape and the tape is out of operative relation to the heads; (2) a recording or playback position, in which the tape is moved past the recording and playback heads and wound from a supply reel onto a takeup reel, and one or the other head is optionally rendered active; (3) a position preparatory to playback in which the tape is being rewound; and (4) a fast feed position, useful for bringing a specific portion of the tape quickly to cooperative relation to one or the other of the heads.

It is another object of this invention to feed the tape at any one of the two standard speeds past the heads, by the aid of a belt shifting device.

It is still another object of this invention to ensure that the tape will not be too slack or too tight, by the use of an automatically operating tensioning device.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings.

Figures 5, 6, 7:
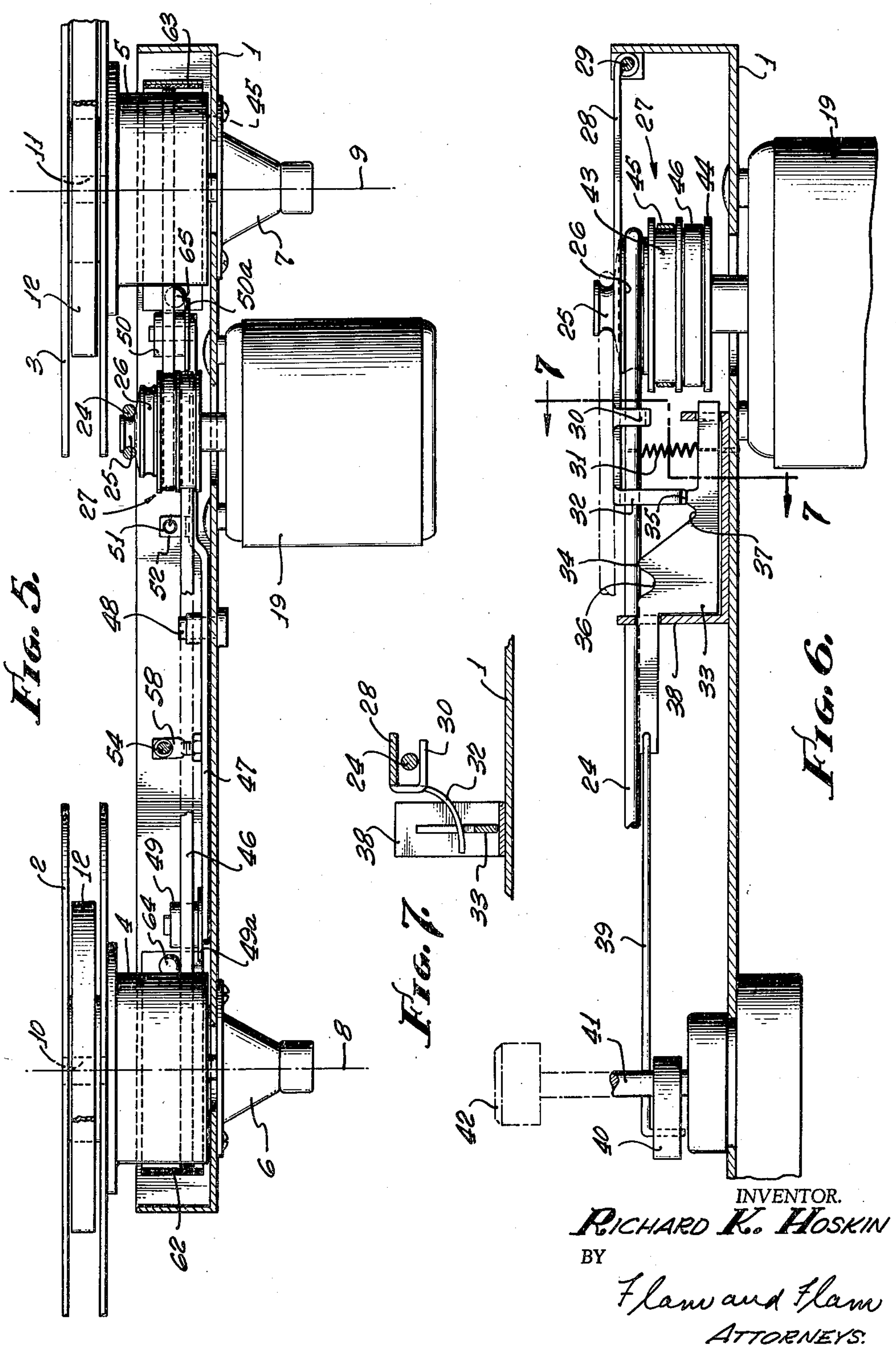
FIG. 5 is a sectional view taken along a plane corresponding to line 5—5 of FIG. 2.
FIG. 6 is a sectional view taken along a plane corresponding to line 6—6 of FIG. 2.
FIG. 7 is a detail fragmentary sectional view taken along a plane corresponding to line 7—7 of FIG. 6.

A rectangular casing 1 serves as a support for many of the essential parts of the mechanism. This mechanism includes a supply reel 2 and a takeup reel 3. These reels are mounted on rotary drums 4 and 5 (FIG. 5) which are in turn adequately supported for rotation by the aid of bearing structures 6 and 7 (FIG. 5). These are supported on casing 1. The axes of rotation 8 and 9 of these reels are parallel and spaced apart. The shafts 10 and 11 upon which the drums are mounted are shown in section in FIGS. 1 and 2. A tape 12 (FIGS. 1 and 2) extends between the two reels 2 and 3.

The tape 12 is adapted to be in operative contact with three heads. One of these heads, such as 13, may be an eraser head for erasing an electromagnetic record on the tape. Another head 14 may be a recording head for magnetically recording sound on the tape, and the third head 15 may be a playback head for converting the magnetic record to electrical impulses to be fed into a speaker system or other translating device.

The three heads 13, 14 and 15 are diagrammatically shown and are appropriately supported upon a supporting plate 16. This plate 16 is shown as mounted upon the bottom of the casing 1 by the aid of posts 17, as shown most clearly in FIG. 2. Tubular spacers 18 (FIG. 3) surround these posts 17. The tape 12 passes in front of this plate 16 for cooperation with the eraser head 13, the recording head 14 and the playback head 15.

Since the operation of magnetic recorders, playback mechanisms and erasers is well-known, further explanation of this feature of the apparatus is considered unnecessary.

An electric motor 19 (FIGS. 5 and 6) is mounted on the rear of casing 1 for supplying motive power for rotating the drums 4 and 5, as well as for operating a pulley 20 (FIGS. 1 and 2) located immediately below the motor 19, as viewed in FIG. 2. The pulley 20 is intended to provide an accurate metering drive for the tape 12. For this purpose, it is mounted on a shaft which carries a metering roll 21 adapted to contact the tape 12 (FIG. 2). A pressure roll 22, as described hereinafter, serves to urge the tape 12 tightly against the metering roll 21.

The speed of the metering roll is carefully predetermined. The motor 19 accordingly is chosen as a synchronous motor. The rate at which the tape 12 proceeds is thus carefully controlled.

As hereinafter described, the drives for the supply reel 2 and the takeup reel 3 are quite loose and capable of slipping so that the rate of advance of the tape 12 is determined solely by the rotation of the metering roll 21.

The cooperating pressure roll 22 is mounted upon a lever 23 which is operated in a manner to be hereinafter described. This lever is pivoted on a pin **23*a* mounted on plate 16. Lever 23 also carries a bent rod 23*b* adapted to engage the upper surface of tape 12 to move the tape away from the heads when lever 23 is moved to the inactive position of FIG. 1. There is a choice of speed for the tape drive, by choosing the speed of the metering roll 21. For this purpose, a round belt 24 (FIGS. 1, 2, 5 and 6) connects the motor 19 to the pulley 20, and the belt 24 may ride in either one of the two grooves 25 or 26 of different diameters, formed on the pulley structure 27 driven by the motor 19** (FIGS. 5 and 6).

In the position of FIG. 6, the metering roll 21 is driven at a high speed, and in the position of FIG. 5, the metering roll is driven at a lower speed.

This adjustment from high to lower speed may be effected manually. Thus, there is a shift plate 28 (FIGS. 1, 2, 6 and 7) which is pivoted adjacent the edge of the casing 1 as by the aid of a pin 29. As shown most clearly in FIGS. 6 and 7, this plate 28 carries a finger 30. The belt 24 extends between the plate 28 and the finger 30. Accordingly, when the plate 28 is rotated in a clockwise direction from the position shown in FIG. 6, the belt 24 will be shifted to the uppermost position into the groove 25 of the pulley structure 27. This upward lifting is resisted resiliently by a spring 31.

In order to lift the plate 28 for the purpose of shifting the belt 24, use is made of a cam follower finger 32 attached to the plate 28. This cam follower is arranged to cooperate with a linearly movable cam 33. This cam 33 is in the form of a flat plate having a high crest 34, a low crest 35 and recesses 36 and 37 adjacent the crests 34 and 35, respectively. A guide 38 is provided for the cam 33.

In the position shown in FIG. 6, the low crest 35 is active to keep the plate 28 and the finger 30 out of contact with the belt 24 to permit it to run without frictional hindrance in the larger diameter groove 26.

Movement of the cam 33 sufficiently toward the right will cause the high crest 34 to be active for urging the belt 24 into the smaller groove 25. A slight additional movement of the cam 33 to the right will cause the follower 32 to be received in recess 36 so that the finger 32 is moved to be free of the belt 24.

Reverse movement of the cam 33 toward the left causes shifting of the belt 24 to the larger groove 26. This occurs when the follower 32 is in the recess 37. The additional leftward movement brings the mechanism to the position of FIG. 6, ensuring that the belt 24 is free of the interference by the shifter mechanism.

Any mechanical means may be provided for moving the cam 33 linearly. In the present instance, an operating rod 39 (FIGS. 1, 2 and 6) is coupled to the cam 33. Its opposite end is anchored to an eccentric 40 mounted on a shaft 41 which in turn is rotatable by a knob 42. The knob 42 may also be utilized for the control of the electrical circuits, if desired.

The pulley structure 27 driven by the motor 19 also includes flanged pulleys 43 and 44 (FIG. 6). The pulley 43 is joined by a thin flat belt 45 to the cylindrical drum 5 of reel 3. A similar flat belt 46 extends around pulley 44 and drum 4 and is twisted, as indicated in FIGS. 1 and 2.

Figure 1:
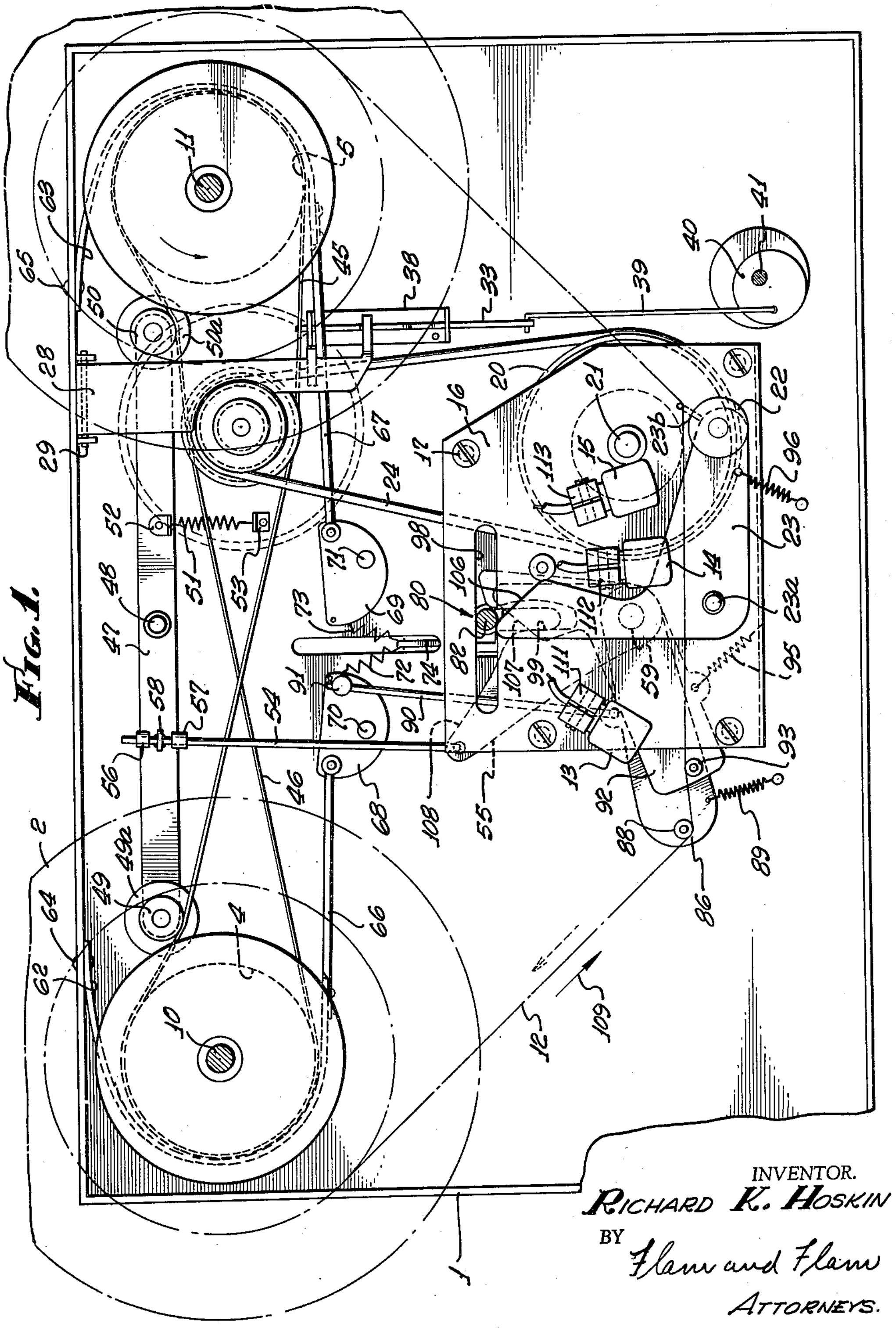
FIGURE 1 is a plan view of an apparatus incorporating the invention, the apparatus being shown in a neutral position, the tape being stationary and out of operating position with respect to the heads.
Figure 2:
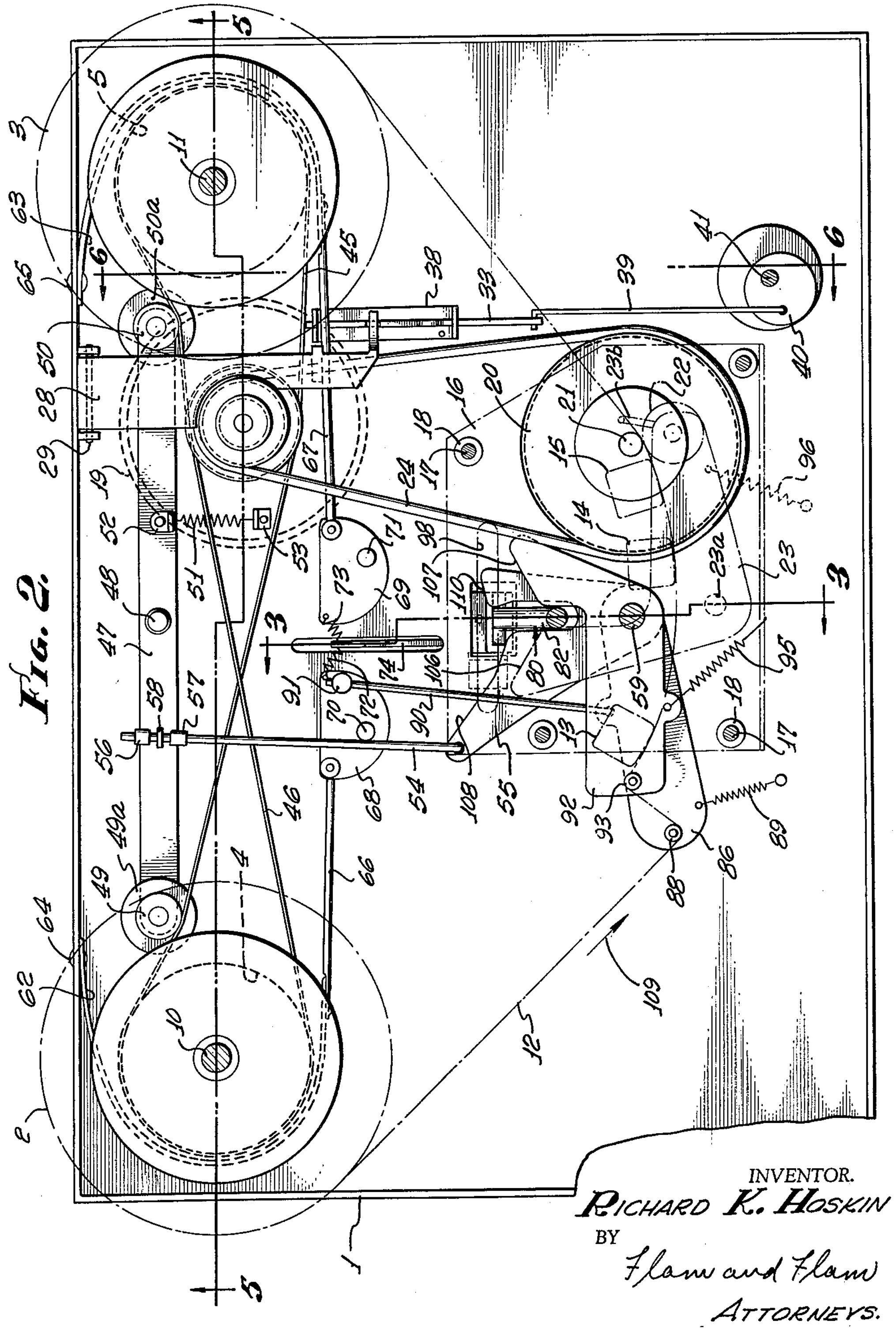
FIG. 2 is a view similar to FIG. 1, but illustrating the apparatus in position for recording or playback, one of the supporting plates being omitted for the sake of clarity and indicated in phantom lines only.
Figures 8, 9:
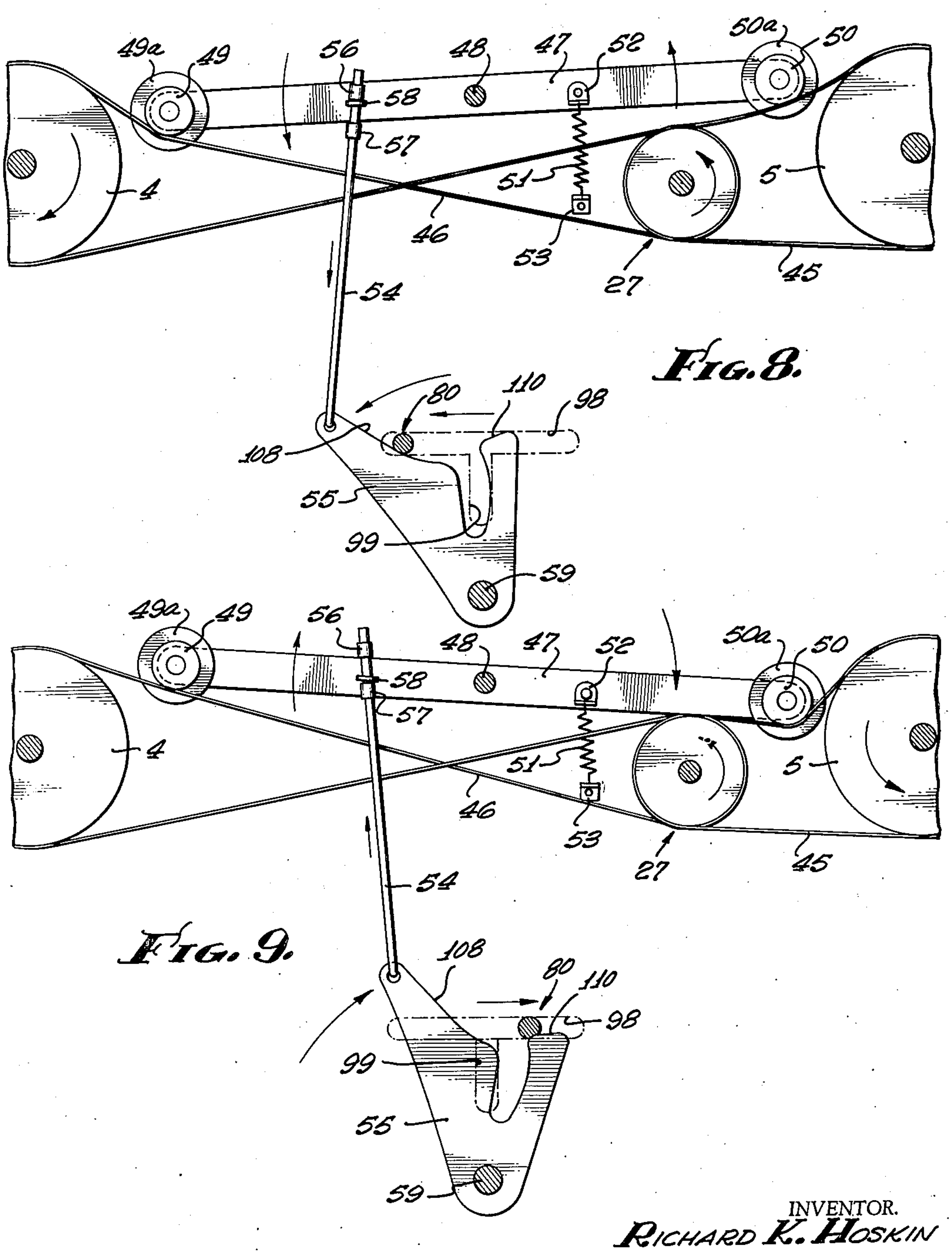
FIGS. 8 and 9 are views, mainly diagrammatic, illustrating several positions of the control means for driving the supply and takeup reels for the tape.

In the neutral position of FIG. 1, the belts 45 and 46 are loose so that there is no effective drive from the motor 19 to either of the reels 2 and 3. Furthermore, the direction of rotation of the pulley structure 27 is such that when the belt 45 is tightened, as indicated in FIG. 9, the takeup reel 3 is rotated in a counterclockwise direction. Conversely, when the belt 46 is tightened, as indicated in FIG. 8, the drum 4 is driven in a clockwise direction and reel 2 is appropriately driven to rewind the tape 12 upon the reel 2.

By mechanism now to be described, the belts 45 and 46 can be optionally rendered effective to provide a drive for either of the two reels 2 and 3. When reel 3 is driven, there is a slight overdrive tending to pull the tape 12 between the metering roll 21 and the roll 22. Accordingly, there is slippage between drum 5 and belt 45, and there will always be a force sufficient to move the tape 12 onto the reel 3 without any slack.

To provide the tightening of the belts 45 and 46, use is made of an arm 47 which is pivoted upon a pin 48 supported on the casing 1. This arm is shown to best advantage in FIGS. 1, 2, 8 and 9. Adjacent each end of the arm there is an idler pulley 49 or 50, each provided with a guide flange 49*a*, 50*a* (FIG. 5). When the arm 47 is in the active position of FIG. 2, roller 50 tightens belt 45 sufficiently to provide a slipping drive between the motor 19 and the drum 5 of reel 3. This effect is produced by urging arm 47 in a clockwise direction by the aid of a tension spring 51. The spring 51 is anchored to an ear 52 carried by the arm 47 and is anchored at its other end in an ear 53 carried by the casing 1.

When it is desired to rewind the tape 12, the arm 47 is moved in a counterclockwise direction to the position of FIG. 8, so that the idler pulley 49 serves to tighten the belt 46.

At times it may be desired to provide a fast forward feed for the tape. For example, this fast feed may be used quickly to bring any part of tape 12 to operative position, or for erasing the record, or the like. Under such circumstances, the arm 47 is urged in a clockwise direction, as indicated in FIG. 9, to assume a position in which the belt 45 is tightened more than in the normal drive position of FIG. 2.

In order to operate the arm 47, use is made of a push rod 54 pivotally joined to a lever 55. This push rod is provided at its upper end with opposed collars 56 and 57. Between these collars is located an ear 58 carried by the arm 47. There is substantial clearance between the ear 58 and each of the collars 56 and 57. This clearance makes it possible to permit spring 51 to operate alone on arm 47 to bring it to the normal operating position of FIG. 1. Nevertheless, upon sufficient upward movement of rod 54, the ear 58 is positively moved to the fast driving position of FIG. 9.

Figures 3, 4:
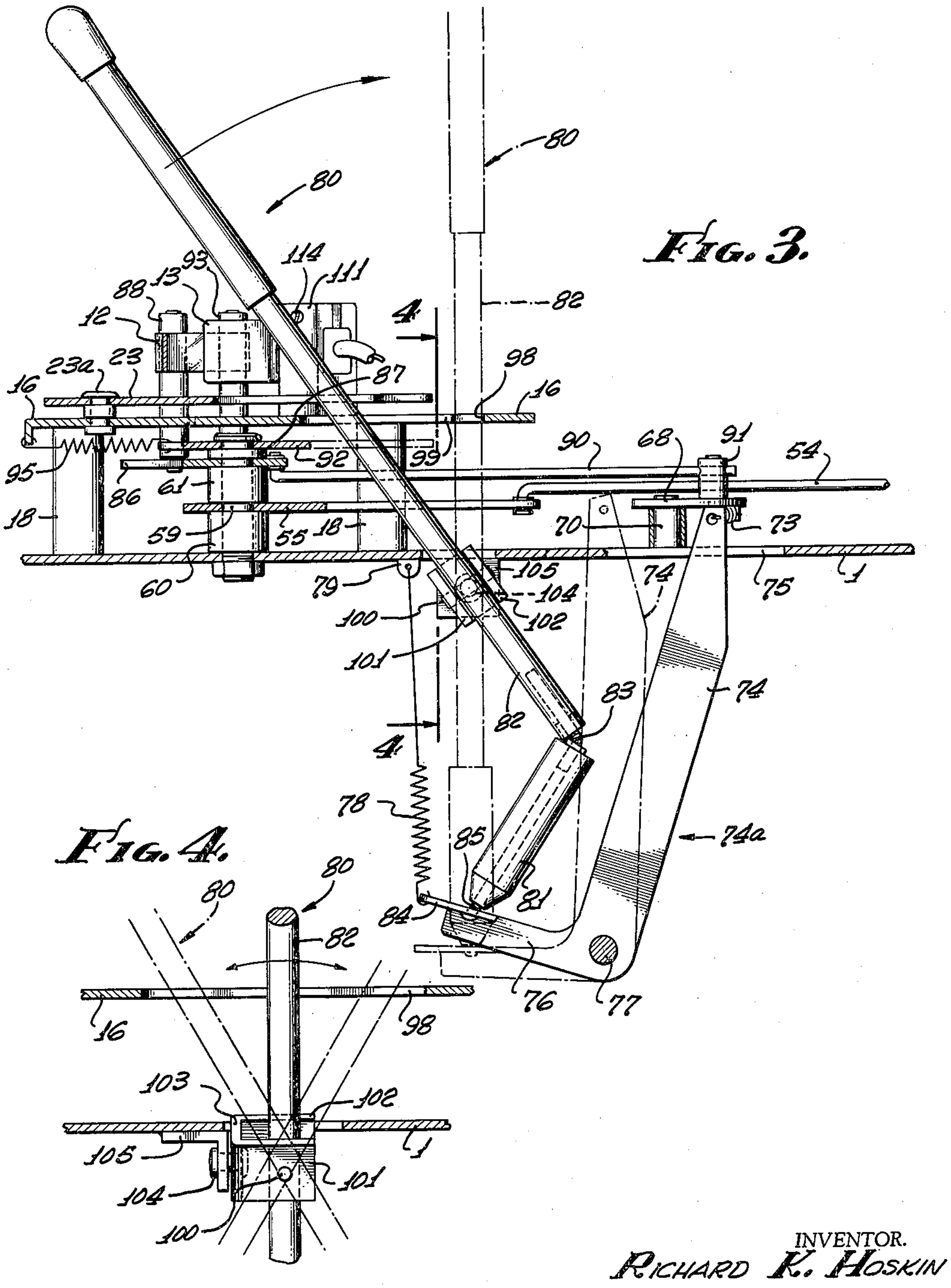
FIG. 3 is an enlarged sectional view taken along a plane corresponding to line 3—3 of FIG. 2.
FIG. 4 is a fragmentary sectional view taken along a plane corresponding to line 4—4 of FIG. 3.

The lever 55 is mounted for rotation on a stationary pivot pin 59 appropriately supported in the casing 1 (see specifically FIG. 3). The manner in which this lever 55 is moved between the positions of FIGS. 2, 8 and 9 will be described hereinafter. The pin 59 is provided with spacer sleeves 60 and 61 on opposite sides of the arm 55 in order to restrain the arm 55 against axial movement. This pin serves additionally to pivot several levers and arms, all as hereinafter described.

Means are provided for braking the drums 4 and 5 and thereby arrest the motion of the reels 2 and 3. Thus, there is a pliant yielding brake band 62 (FIGS. 1, 2 and 5) cooperating with the drum 4, and a similar brake band 63 cooperating with the drum 5. Each brake band may have a thin metal backing member. Each brake band 62 and 63 is anchored as by the aid of the rivets 64 and 65 to the casing 1 (see particularly FIGS. 1 and 2). The belt 46 for driving the reel 2 is interposed between the drum 4 and the brake band 62. Similarly, the belt 45 for driving the reel 3 is interposed between the drum 5 and the brake band 63.

Since the bands 62 and 63 are yielding, and since belts 45 and 46 are quite thin, these belts do not appreciably interfere with the braking operation of the bands upon the peripheries of drums 4 and 5.

The free ends of the brake bands 62 and 63 are connected to rods 66 and 67. Rod 66 is pivotally connected to a brake actuator 68. Rod 67 is similarly pivotally connected to a brake actuator 69. These two actuators are pivotally mounted upon pins 70 and 71 supported by the casing 1. Tension springs 72 and 73 connect the inner ends of the actuators 68 and 69 to one arm 74 of a lever 74*a* (see also FIG. 3). With the arm 74 in the vertical position of FIG 2, as shown in full lines in FIG. 3, the tension of both springs 72, 73 is relived, and accordingly there is no appreciable force tending to rock the actuators 68 and 69 about their pivots. The actuators 68 and 69 thus free the brake bands 62 and 63 from the drums 4 and 5. In the position of FIG. 1, however, the arm 74 is pulled downwardly to rotate the actuators 68 and 69 by the tension of springs 72, 73 for applying the brakes. FIG. 1 accordingly corresponds to the neutral position, the brakes being applied.

The arm 74, as shown most clearly in FIG. 3, extends through a slot 75 in casing 1. Lever 74 has a short arm 76. This lever is pivoted on a stationary pin 77 located below casing 1. The short arm 76 is anchored to a tension spring 78; and the upper end of the spring 78 is anchored to an ear 79 mounted on the rear wall of the casing 1.

In the phantom line position of FIG. 3, the arm 74 is in the brake-applying position, the springs 72 and 73 being extended and exerting a tension force. It is held in this position by the aid of an operating rod 80 which comprises a lower part 81 capable of being flexed with respect to the upper part 82. The two parts 81 and 82 are joined, for example, by a wire helix 83, the ends of which are anchored in the two abutting ends of parts 81 and 82.

The spring 78 is anchored to a transverse ledge portion 84 extending laterally from the lever arm 76. This transverse portion 84 has a slot therein for the accommodation of the headed projection 85 at the lower end of the part 81. The lateral offset provided by this portion 84 is required because of the lateral spacing between arm 74 and rod 80, as viewed in FIGS. 1 and 2.

In the upright or vertical position of rod 80 illustrated in phantom lines in FIG. 3, the parts 81 and 82 are in axial alignment. The spring 78 is stretched and the arm 74 takes the phantom position, causing the brakes to be applied (see also FIG. 1). Any deviation in any direction whatever from this vertical position causes the arms 81 and 82 to depart from coaxial position; and the spring 78 is free to pull the lever **74*a*** in a clockwise direction to release the brakes. This position is shown in full lines in FIG. 3.

As hereinafter described, the rod 80 is a master control rod capable of effecting operation of the mechanism in several optional fashions.

Pivot pin 59 (FIGS. 1, 2 and 3) also accommodates an arm 86 that is a part of a device for controlling the tension of tape 12. This arm is held against axial movement as shown in FIG. 3 by the aid of a collar 87.

This arm 86 carries a roller 88 engaging tape 12. The arm is urged by a spring 89 in a counterclockwise direction to place tension upon the tape 12. In the event the tension is reduced so as to provide intolerable looseness in the tape 12, the spring 89 serves to pull arm 86 downwardly. This downward movement pulls a rod 90 that is fastened to a collar 91 mounted on the brake actuator 68. This collar 91 is rotatably mounted on the actuator 68 so that rod 90 can stay in alignment with the diametric aperture through the collar 91.

Thus, assuming, as viewed in FIG. 2, that there is too much slack in the tape 12, the arm 86 is allowed to drop slightly and rod 90 is pulled downwardly, rotating the actuator 68 in a clockwise direction and applying brake band 62 to the supply reel 2. Spring 72 does not interfere with this action. On the other hand, should the tension be too great, the arm 86 is moved in a clockwise direction or upwardly by tape 12, and the rod 90 is moved upwardly to release the brake. This automatic tensioning device thus serves to keep the tape 12 at a substantially uniform tension.

There is another arm 92 also mounted on the pivot pin 59, which arm carries means for moving the tape 12 into cooperative relation with the heads 13, 14 and 15. This arm carries a roller 93 engaging beneath the tape 12. The arm 92 is urged in a counterclockwise direction by the aid of a tension spring 95 anchored to the plate 16.

The arm 23 which carries the pressure roll 22 is urged in a clockwise direction about its pivot **23*a* by the aid of a spring 96**.

In the position of FIG. 2, the arms 23 and 92 are active to provide pressure to the tape 12 against the metering roll 21, as well as to move the tape 12 into cooperative relation with all of the heads. Which particular head is active may be determined by the aid of circuit controllers.

The control rod structure 80 is guided by a T-slot 98 in the plate 16 (see particularly FIGS. 1, 3, 8 and 9). The upper part of this slot 98 is generally horizontal, as viewed in FIGS. 8 and 9, and has a vertical extension 99. In the neutral position of FIG. 1, the rod 80 is vertical and is located at the intersection of the horizontal and vertical portions of the slot 98. The arm 74 in this position is effective to apply the brake bands 62 and 63 to the wheel drums 4 and 5.

Arms 23, 55, 86 and 92 each have cam portions, as hereinafter described, placed in the path of movement of operating rod 80, as guided by the slot 98.

The arm 80 is supported by a universal swivel, making it possible for the arm 80 to travel within the vertical slot 99 or leftward or rightward, as viewed in FIG. 1. No matter which way of these three directions the rod is moved, the parts 81 and 82 of the rod are displaced from co-axial relationship and the brakes are released as shown in full lines in FIG. 3, and as heretofore described.

In order to permit the rod 80 to move in any one of these three directions, use is made of a swivel connection shown most clearly in FIGS. 3 and 4. Thus, a pivot pin 100 passes through the rod 80, as well as through the two arms 101 and 102 of a clevis 103. The clevis 103 is mounted on a pivot pin 104 fixed to a bracket 105 supported on the casing 1. The axis of pin 104 is transverse to the axis of pin 100, thereby effecting a universal connection.

Movement of the rod 80 downwardly from the position of FIG. 1 to the position of FIG. 2 causes several controls to function. The brakes 62 and 63 are released as hereinbefore explained. Secondly, the arms 23 and 92 are rotated so as to place the tape 12 into operative position. This is effected by the aid of the sloping surfaces 106 and 107 respectively formed on short extensions of the arms 23 and 92, and at least partially exposed by slot 98. In the neutral position of FIG. 1, these sloping surfaces cross, but they are urged apart by rod 80 as the rod moves downwardly to the position of FIG. 2. The arm 23 is thus moved in a counterclockwise direction, and the arm 92 in a clockwise direction. The rod 80 then passes downwardly along side surfaces of the arms 23 and 92 that engage opposite sides of the rod 80. Arm 55, in this operation of rod 80, is not appreciably moved since rod 80 is accommodated in slot **55*a* in arm 55**.

The tape 12 is moved from the supply reel 2 onto the takeup reel 3. The supply reel 5 is somewhat loosely driven by the belt 45 and at a rate in excess of that necessary to pass the metering roll 21. This excess movement is taken care of by slippage of the belt 45.

When it is desired to stop the operation, the arm 80 is simply returned to the vertical position (FIG. 1). If now it is desired to rewind the tape 12, the arm 80 is moved toward the left as viewed in FIG. 8. For this movement, the arm 55 is rotated by the rod 80 in a counterclockwise direction. This occurs by virtue of the contact of rod 80 with the sloping cam surface 108 carried by the arm 55. This movement causes the pull rod 54 to move downwardly, releasing the idler pulley 50 and causing idler pulley 49 to tighten the belt 46. This is the rewind position in which the drum 4 is moved in a clockwise direction for moving the tape in a direction reverse to that indicated by the arrow 109 in FIG. 2. In this position, the arms 23 and 92 are in the inactive position of FIG. 1, the tape 12 being released from the heads 13, 14 and 15.

In order to provide a fast feed for any reason, such as for erasing or the like, the rod 80 is moved toward the right as viewed in FIG. 9. In this position, the arm 55 is moved by contact of the arm 80 with the cam surface 110 in a clockwise direction so as to move the arm 47 also in a clockwise direction. This causes firm contact of the belt 45 with the drive pulley structure 27 and the drum 5. In this position also, the arms 23 and 92 remain in the inactive position of FIG. 1.

The particular manner of supporting the heads 13, 14 and 15 is not important so far as the present invention is concerned. However, there are shown posts 111, 112 and 113 (FIGS. 1 and 3) to provide such a support. These posts are mounted upon the plate 16. Set screws 114 are used for clamping the heads to the respective posts.

The inventor claims:

1. In a machine for operating a tape: a supply reel for the tape; a takeup reel for the tape; means for moving the tape in either forward or reverse directions; means for braking said reels; a control rod; a universal mounting for the rod about a fixed point; means for guiding the rod for movement in the three directions from a neutral position; means effective in said neutral position to apply the braking means; means whereby movement of the rod in any of the three directions from said neutral position serves to release the braking means; means whereby movement of the rod in the first direction causes the takeup reel to be driven, and to move the tape in an operating position; means whereby movement of the rod in the second direction causes the tape to be placed into an inoperative position and the supply reel to be driven; and means whereby movement of the rod in the third direction causes the takeup reel to be driven at an advanced speed.

2. In a machine for operating a tape: a supply reel for the tape; a takeup reel for the tape; means for moving the tape in either forward or reverse directions; means for braking said reels; a control rod; a universal mounting about a center for the rod; means for guiding the rod for movement in three directions from a neutral position; means effective in said neutral position to apply the braking means; means whereby movement of the rod in any of the three directions from said neutral position serves to release the braking means; a pair of pivotally mounted levers; means connecting one of the levers to the reel driving means; and means connecting the second lever to the tape for moving the tape out of an operative position; said rod when moved in the first direction serving to move the first lever for causing the drive to be effective upon the takeup reel, and to move the second lever to a position in which the tape is in an operative position; said rod when moved in the second direction serving to move the first lever for causing the drive to be effective upon the supply reel and to move the second lever to a position in which the tape is out of operating position; said rod when moved in the third direction serving to move the first lever for causing the drive to be effective at an increased speed upon the takeup reel, and to move the second lever to a position in which the tape is out of operating position.

3. In a machine for operating a tape: a supply reel for the tape; a takeup reel for the tape; means for moving the tape in either forward or reverse directions; means for braking said reels; a control rod; a universal mounting about a center for the rod; means for guiding the rod for movement in three directions from a neutral position; means effective in said neutral position to apply the braking means; means whereby movement of the rod in any of the three directions from said neutral position serves to release the braking means; means for operating the reel driving means respectively causing one or the other of the reels to be driven; means for moving the tape into and out of an operating position; said rod when moved in the first direction serving to move the operating means for the reel drive for causing the drive to be effective upon the takeup reel, and to operate the tape moving means for moving the tape into operating position; said rod when moved in the second direction serving to move the operating means for the reel drive for causing the drive to be effective upon the supply reel, and to operate the tape moving means for moving the tape out of operating position; said rod when moved in the third direction serving to move the operating means for the reel drive for causing the drive to be effective at an increased speed upon the takeup reel, and to operate the tape moving means for moving the tape out of operating position.

4. In a drive mechanism for a supply reel and a takeup reel: a drive pulley; a pair of belts connecting the pulley respectively with the reels and normally in loose position; a pivoted arm having idler pulleys respectively on opposite sides of the pivot; resilient means for urging the arm in one direction to tighten one of the belts; said resilient means having sufficiently force so that the said one belt is tightened to a degree whereby a slipping drive is effected; and means for moving the arm in the opposite direction to tigthen the other belt; said means for moving the arm being normally free of said arm.

5. In a tape driving system: a supply reel; a takeup reel; brakes for each of the reels; a lever having a pair of arms, one arm being connected to the brakes; a rod having two longitudinally aligned portions capable of flexing out of alignment; and a universal pivot means for one portion of the rod; the other portion being connected to the other arm of the lever, whereby movement of the rod from a neutral position operates on said other arm to release the brakes.

6. In a tape driving system: a supply reel; a takeup reel; brakes for each of the reels; a lever having a pair of arms, one arm being connected to the brakes; a rod having two portions capable of flexing out of alignment; a universal pivot means for one portion of the rod; the other portion being connected to the other arm of the lever, whereby movement of the rod from a neutral position operates on said other arm to release the brakes; means forming a T-shaped guide slot for the rod to confine movement of the rod from the neutral position corresponding to the intersection of the arms of the T-slot; means operated by movement of the rod in the vertical arm of the slot for causing the tape to advance from the supply reel; and means controlled by movement of the rod in the horizontal slot for causing the tape to be rewound or to be advanced at a rapid rate.

7. The combination as set forth in claim 6, with the addition of a roller also controlled by the rod for metering the rate of movement of the tape, and said roller being placed in operative position when the control rod causes movement of the tape to an operating position.

8. In a tension control system for continuously moving tape: a supply reel; a takeup reel; the tape extending between the reels; a drum mounted coaxially with the supply reel; a brake band extending partially around the drum; a spring for urging the brake band into active position; a pivoted arm; means carried by the arm for contacting the tape; means resiliently urging the arm in a direction to take up slack in the tape; and means providing a connection between the arm and the brake band, for urging the brake band toward inactive position in response to angular movement of the arm in opposition to the means that resiliently urges the arm in one direction.

9. In a tape driving system: a supply reel; a takeup reel; a brake drum carried by one of the reels; a brake band extending angularly around the drum; a pull rod for the band to cause it to engage the drum; a pivoted brake actuator connected to the pull rod; a spring connected at one of its ends to the actuator for resiliently urging it toward brake engaging position; and movable means connected to the other end of the spring for increasing the spring force to cause the band to engage the drum.

10. In a tape driving system: a supply reel; a takeup reel; a brake drum carried by one of the reels; a brake band extending angularly around te drum; a pull rod for the band to cause it to engage the drum; a pivoted brake actuator connected to the pull rod; a spring connected at one of its ends to the actuator for resiliently urging it toward brake engaging position; movable means connected to the other end of the spring for increasing the spring force and to cause the band to engage the drum, comprising a lever, one arm of which is connected to the spring; a control rod having longitudinally aligned portions; resilient means so joining the portions as to permit universal flexure of one portion with respect to the other; said one portion being joined to the other arm of the lever; and a universal mounting for the other portion of the control rod.

11. In a tape driving system: a supply means for the tape; a takeup means for the tape; brake means for at least one of said means; a lever having a pair of arms; one arm cooperating with the brake means for causing the brake means to be effective; a control rod having two longitudinally aligned portions, one of said portions having universal flexure with respect to the other portion; said one portion being connected to the other arm of the lever; and a universal pivot means for the other portion of the rod.

References Cited in the file of this patent

UNITED STATES PATENTS

| | | |
|---|---|---|
| 318,577 | Otto | May 26, 1885 |
| 1,944,039 | Sweet | Jan. 16, 1934 |
| 2,115,737 | Menschner | May 3, 1938 |
| 2,328,597 | Woolf | Sept. 7, 1943 |
| 2,351,005 | Camras | June 13, 1944 |
| 2,487,976 | Kuhlik | Nov. 15, 1949 |
| 2,499,273 | Leach | Feb. 28, 1950 |
| 2,539,858 | Offutt | Jan. 30, 1951 |
| 2,555,643 | Harrison | June 5, 1951 |
| 2,639,333 | Howell et al. | May 19, 1953 |
| 2,725,200 | Ward | Nov. 29, 1955 |
| 2,790,643 | Gedde et al. | Apr. 30, 1957 |
| 2,793,039 | Hironimus | May 21, 1957 |
| 2,813,686 | Schroter | Nov. 19, 1957 |

FOREIGN PATENTS

| | | |
|---|---|---|
| 1,024,985 | France | Apr. 9, 1953 |
| 946,851 | Germany | July 19, 1956 |